April 17, 1951  J. P. ARNDT  2,548,854
VARIABLE POWER TRANSMISSION MECHANISM
Filed Dec. 14, 1944  3 Sheets-Sheet 1

INVENTOR
JOHN P. ARNDT
BY
Hoguet, Neary & Campbell
his ATTORNEYS

April 17, 1951   J. P. ARNDT   2,548,854
VARIABLE POWER TRANSMISSION MECHANISM

Filed Dec. 14, 1944   3 Sheets-Sheet 3

INVENTOR
JOHN P. ARNDT
BY
Hoguet, Neary & Campbell
his ATTORNEYS

Patented Apr. 17, 1951

2,548,854

UNITED STATES PATENT OFFICE 2,548,854

VARIABLE POWER TRANSMISSION MECHANISM

John P. Arndt, Oak Park, Ill., assignor to Charles Bruning Company, Inc., New York, N. Y., a corporation of New York Application December 14, 1944, Serial No. 568,101

3 Claims. (Cl. 74—689)

This invention relates to variable power transmission mechanism, and constitutes an improvement upon the devices disclosed in U. S. Patents Nos. 2,291,928 and 2,318,538.

The power transmission mechanism of the present invention, like those of the above patents, employs a differential train of gearing including primary and secondary shafts, but in the patents the secondary shaft was rotated by a spring back divided pulley. This divided pulley was driven by a belt passing over a flat pulley on the primary shaft, and also passing over a third pulley. The tension of the V belt in the previous set-up is not changed, but remains the same at all times. The speed adjustment is obtained by moving the idler pulley up and down, thereby either opening or closing the spring loaded divided pulley and changing the speed of the particular input shaft. The belt wear, therefore, has considerable effect on the speed output because, as the belt gets thinner, or narrower, the variable speed pulley is allowed to close more, placing the belt in a high position on the spring loaded pulley and thereby decreasing the speed of the input shaft and increasing the output speed.

According to the present invention, the primary and secondary shafts are provided with oppositely tapering cones, and the speed variation is effected by moving the belt along the cones, preferably by moving the third pulley substantially in the direction of its axis. Thus, the tensioning of the belt by the former divided pulley is avoided, and belt wear has no effect upon the speed of the machine driven by the mechanism.

Other objects and features of novelty will be apparent from the following description and the accompanying drawings, in which.

Figure 1:
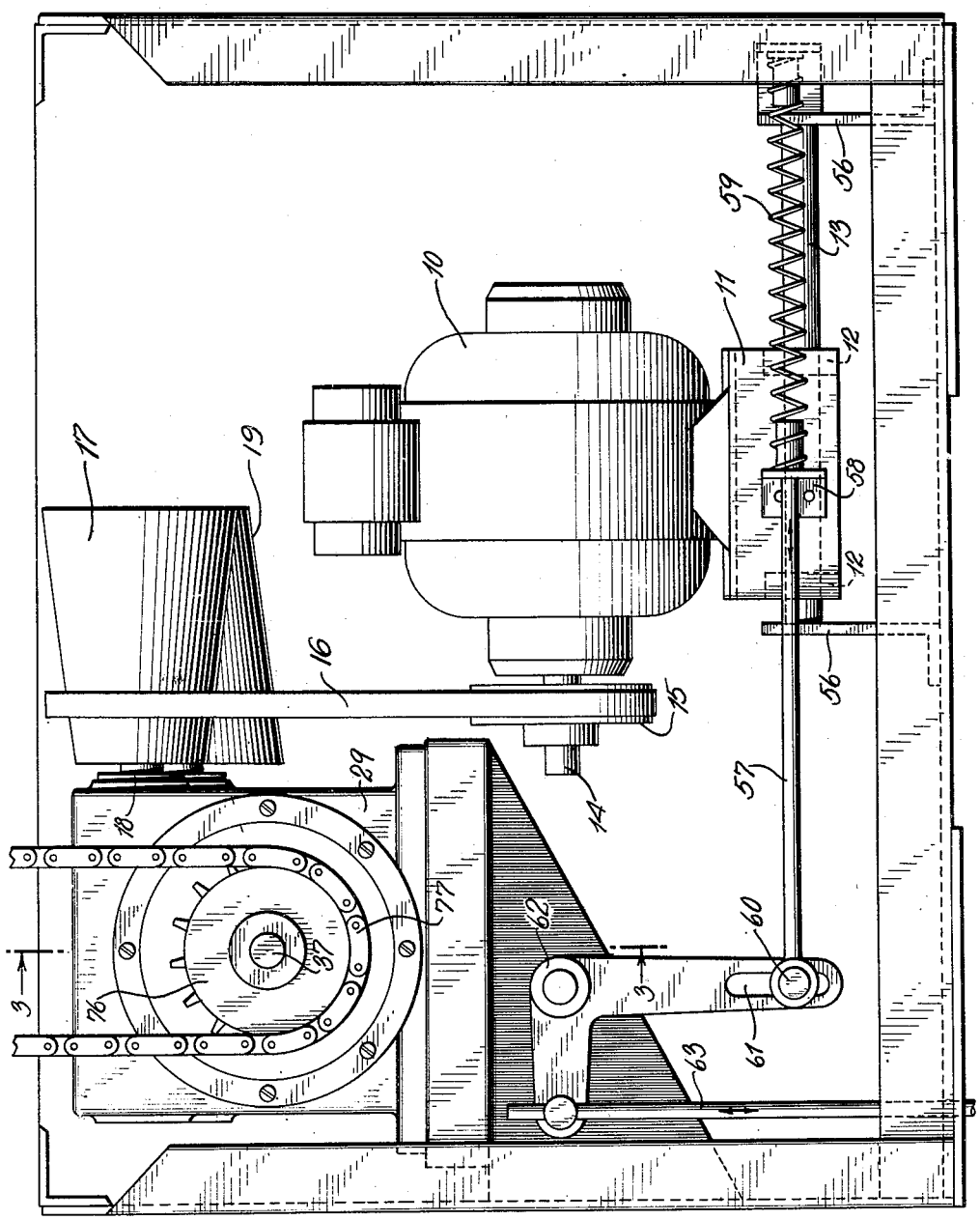
Figure 1 is a side elevation of the variable speed mechanism of the present invention associated with a photo-printing machine.
Figure 2:
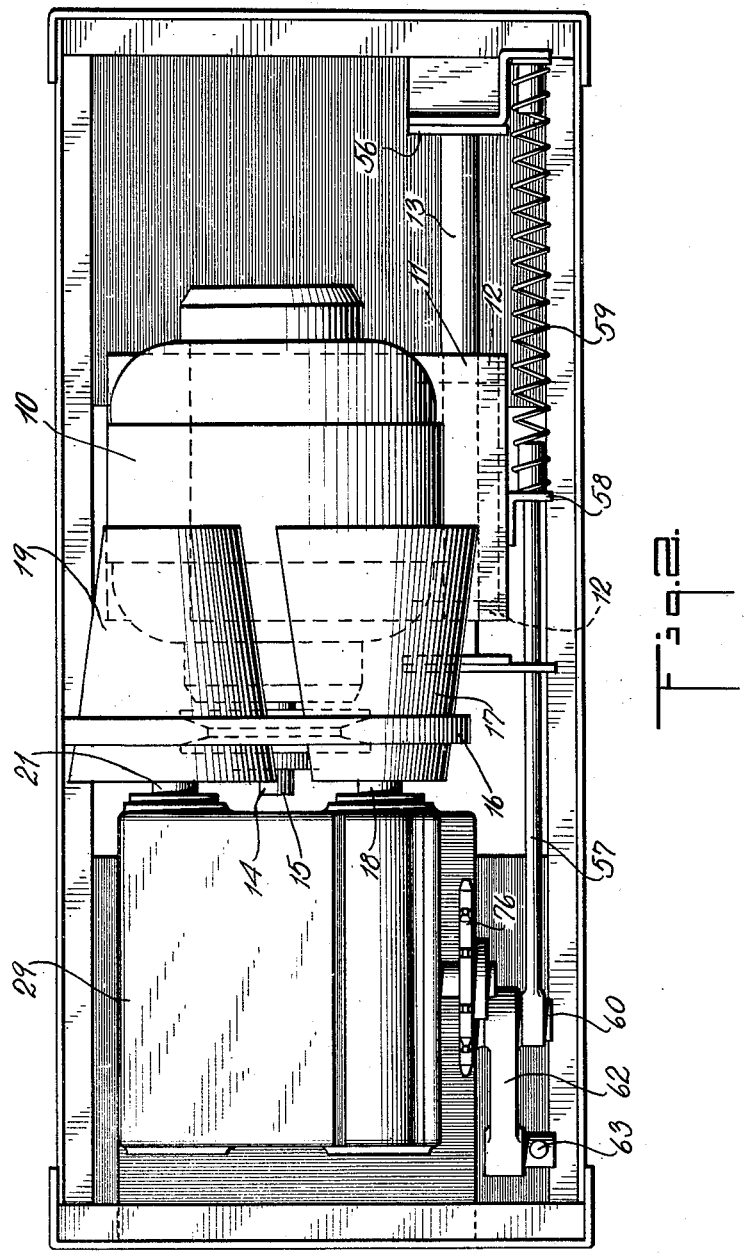
Figure 2 is a plan view of the same.
Figure 3:
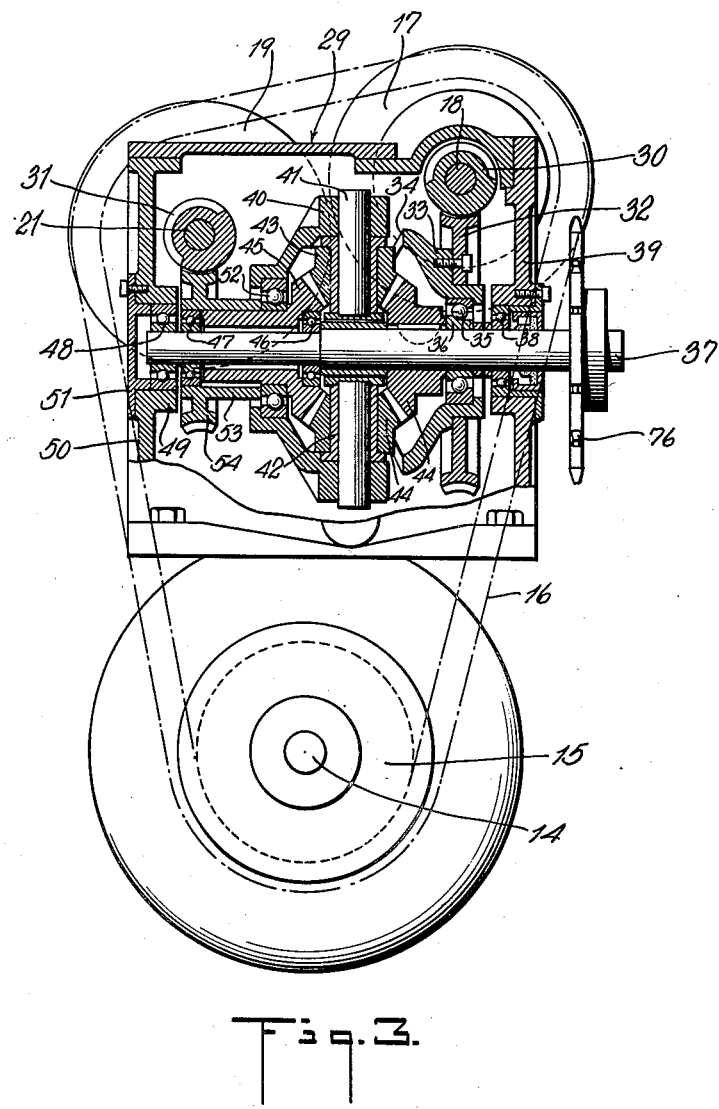
Figure 3 is a vertical section taken along the line 3—3 of Figure 1.

The variable speed assembly comprises a motor 10 secured to a crade 11 pivoted on bearings 12 longitudinally slidably mounted on a shaft 13. The motor shaft 14 carries a pulley 15 over which runs a belt 16. The belt is carried around a cone pulley 17 keyed upon a primary worm shaft 18, and then around an oppositely tapered cone pulley 19 keyed upon a secondary worm shaft 21.

The primary and secondary worm shafts 18 and 21 are journalled through the side walls of a casing 29 which houses a differential mechanism now to be described. The primary shaft 18 carries a worm 30, and the secondary shaft 21 carries a worm 31. The worm 30 meshes with a ring-shaped gear 32 which is mounted upon the face of the shouldered hub 33 of a cage 34. The hub is mounted upon ball bearings 35 carried within a race 36 mounted upon a driven shaft 37 journalled within ball bearings 38 mounted within a closing plate 39 constituting one of the end walls of the casing.

The periphery 40 of the cage 34 affords a mounting for a pair of inwardly projecting oppositely disposed stub shafts 41 each surrounded by a bushing 42 which affords a bearing for a beveled pinion 43. The two beveled pinions 43, which may be termed the revolving pinions, mesh on one side with a driven beveled pinion 44 keyed to the shaft 37, and on the other side mesh with a transmission beveled pinion 45 the hub of which is journalled upon inner ball bearings 46 and outer ball bearings 47 carried by the reduced end of the shaft 37, which is journalled at its terminus within ball bearings 48 mounted within a boss 49 in the end wall 50 of the casing and held in place by a cap 51. The adjacent portion of the cage 34 is mounted upon ball bearings 52 which are carried by the hub of the transmission pinion 45, which also has keyed thereon a hub 53 of a transmission worm gear 54 meshing with the worm 31.

The arrangement is such that the cage 34 with the revolving pinions 33 will be driven at a selected speed depending upon the position of the belt 16 axially of the cone 17, by the primary worm shaft 18, the worm 30 and worm gear 32, and in the absence of resistance the revolving pinions will mesh freely with the teeth of the keyed driven pinion 44, without imparting rotation to the driven shaft 37. The speed and direction of rotation imparted to the driven shaft, therefore, will depend upon the speed of rotation imparted to the transmission pinion 45 by the variable speed drive afforded by the position of the belt 16 on the cone 19.

Thus, with the transmission pinion 45 rotating in the same direction as the rotation of the cage carrying the revolving pinions and at a rate of peripheral speed equal to the peripheral speed of the revolving pinions, the latter will be permitted to rotate freely upon their respective shafts during their orbital travel upon the face of the driven shaft 44, so that no resistance will be afforded to impart rotation to the driven shaft 37, which in these conditions will stand stationary.

If, however, the speed of rotation of the pinion 45, in the same direction as the cage, exceeds the speed of rotation imparted to the revolving orbital pinions by rotation of the cage, a thrust will be established which imparts an opposite rotation to the driven shaft 37. In like manner, when the speed of rotation of the transmission pinion 45 is less than the neutral rotation of the orbital pinions, the same direction of rotation will be imparted to the shaft 37 at the desired speed ratio.

When the belt 16 occupies an intermediate position at about the midpoint of the length of both cone pulleys 17 and 19 which represents the neutral or idle condition within which the rotation imparted to the transmission pinion 45 is equal to and in the same direction as the rotation of the orbital pinions imparted by the cage 34. By moving the belt 16 from neutral position further away from the casing 29, the effective diameter of the cone pulley 17 is increased and the effective diameter of the cone pulley 19 is decreased, so that the speed of rotation of the pinion 45 is rapidly increased, with resultant opposite rotation of the driven shaft. Thus in practical operation it is easily possible, by selection of appropriate gears, to impart to the driven shaft variations in speed of unlimited ratio. Also, by moving the belt 16 from neutral position toward the casing 29, the effective diameter of the cone pulley 17 is decreased and the effective diameter of the cone pulley 19 is increased, and it is possible to provide variable rotation to the driven shaft in the same direction as the pinion 45.

In order to adjust the position of the belt 16, the motor cradle 11 is slidable along the shaft 13, which is mounted on suitable brackets 56 secured to the frame of the machine. Sliding movement of the motor toward and away from the casing 29 is imparted by a rod 57 secured to a lug 58 in the cradle 11, and opposed by a compression spring 59 interposed between the lug 58 and the furthermost bracket 56. The rod 57 terminates in a pin 60 mounted in a slot 61 in one arm of a belt crank 62, the other arm of which is pivoted to an operating rod 63, actuated by suitable means, such as a foot treadle.

As shown, the rotation imparted to the driven shaft 37 is transmitted through a sprocket wheel 76 and a sprocket chain 77 to the sheet or web feeding mechanism of a photo-printing machine, but it is not deemed necesary to describe such mechanism, which serves merely for purposes of illustrating one of the numerous uses to which the present invention may be applied.

The invention is not limited to the details disclosed, but instead includes such modifications as fall within the scope of the following claims.

I claim:

1. A variable speed transmission mechanism comprising a primary shaft, a secondary shaft having a longitudinal axis parallel to the longitudinal axis of the primary shaft, a driven shaft, variable speed transmission gearing in train between the primary and secondary shafts and the driven shaft for imparting variable speeds to the driven shaft, oppositely tapered cone pulleys on said primary and secondary shafts, a driving motor, a pulley driven by said motor and having a longitudinal axis parallel to the longitudinal axes of the primary and secondary shafts, a belt trained around both said cone pulleys and said motor driven pulley to rotate the primary and secondary shafts in a common direction, and means for adjusting the position of the belt along the oppositely tapered cone pulleys in a direction substantially parallel to the axes of the primary and secondary shafts to simultaneously increase the speed of rotation of one of said primary and secondary shafts and decrease the speed of rotation of the other shaft to impart variable speeds to the driven shaft.

2. A variable speed transmission mechanism comprising a primary shaft, a secondary shaft having a longitudinal axis parallel to the longitudinal axis of the primary shaft, a driven shaft, variable speed transmission gearing in train between the primary and secondary shafts and the driven shaft for imparting variable speeds to the driven shaft, oppositely tapered cone pulleys on said primary and secondary shafts, a driving motor, a pulley driven by said motor and having a longitudinal axis parallel to the longitudinal axes of the primary and secondary shafts, a belt trained around both said cone pulleys and said motor driven pulley to rotate the primary and secondary shafts in a common direction, and means for moving the motor driven pulley along its longitudinal axis to adjust the position of the belt along the oppositely tapered cone pulleys in a direction substantially parallel to the axes of the primary and secondary shafts to simultaneously increase the speed of rotation of one of said primary and secondary shafts and decrease the speed of rotation of the other shaft to impart variable speeds to the driven shaft.

3. A variable speed transmission mechanism comprising a primary shaft, a secondary shaft having a longitudinal axis parallel to the longitudinal axis of the primary shaft, a driven shaft, variable speed transmission gearing in train between the primary and secondary shafts and the driven shaft for imparting variable speeds to the driven shaft, oppositely tapered cone pulleys on said primary and secondary shafts, a driving motor, a pulley driven by said motor and having a longitudinal axis parallel to the longitudinal axes of the primary and secondary shafts, a belt trained around both said cone pulleys and said motor driven pulley to rotate the primary and secondary shafts in a common direction, and means for moving the motor and its pulley in a direction substantially parallel to the axes of the primary and secondary shafts to adjust the position of the belt along the oppositely tapered cone pulleys to simultaneously increase the speed of rotation of one of said primary and secondary shafts and decrease the speed of rotation of the other shaft to impart variable speeds to the driven shaft.

JOHN P. ARNDT.

REFERENCES CITED

The following references are of record in the file of this patent:

UNITED STATES PATENTS

| Number | Name | Date |
|---|---|---|
| 1,496,478 | Maimin | June 3, 1924 |
| 1,538,349 | Oates | May 19, 1925 |
| 2,092,241 | Basseur | Sept. 7, 1937 |
| 2,291,928 | Streich | Aug. 4, 1942 |
| 2,318,538 | Streich | May 4, 1943 |

FOREIGN PATENTS

| Number | Country | Date |
|---|---|---|
| 672,470 | France | Dec. 28, 1929 |